Jan. 31, 1950  C. E. KNOX, JR  2,496,167
PIPE COUPLING
Filed May 10, 1948
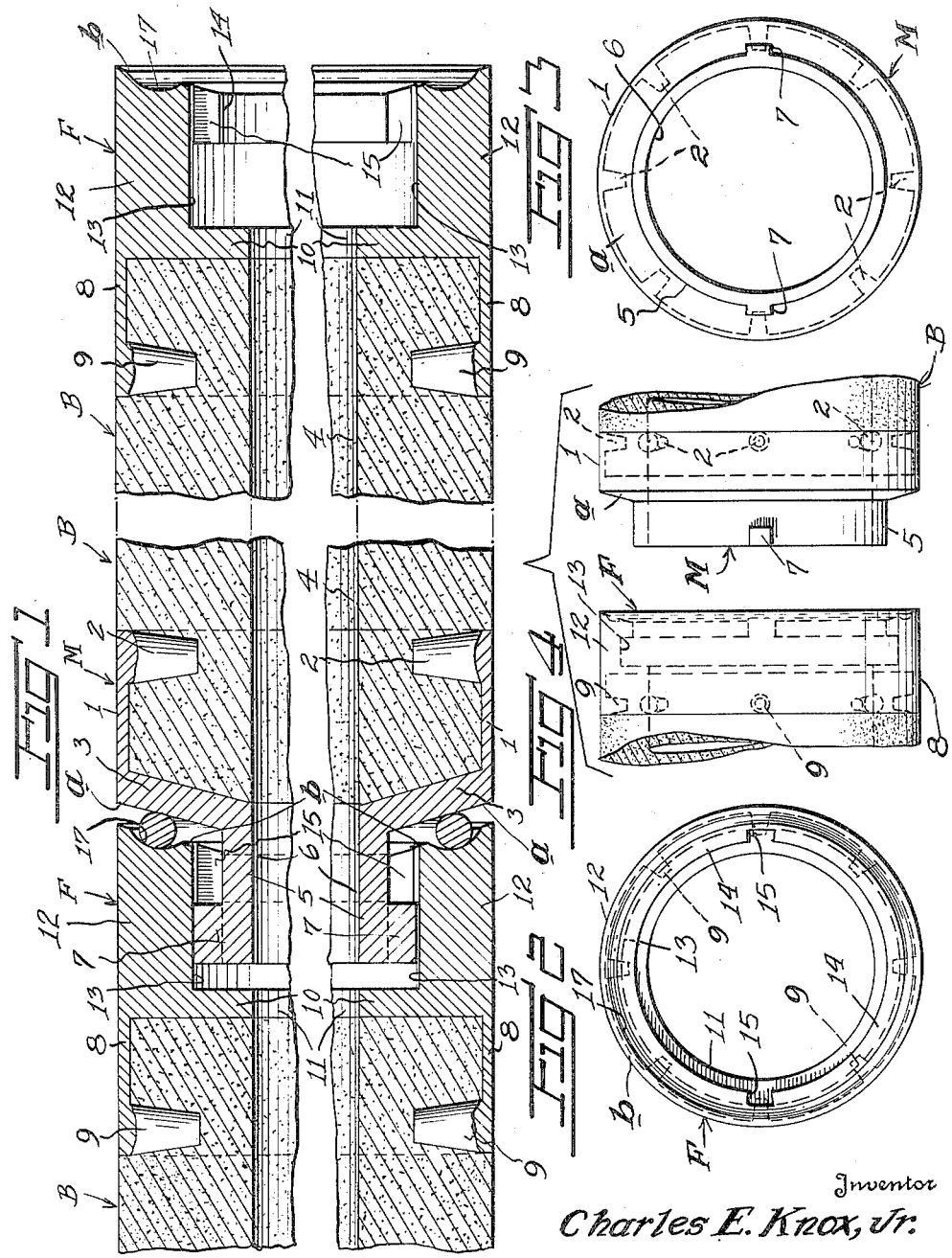
Inventor
Charles E. Knox, Jr.
By Wilfred Lawson
Attorney Patented Jan. 31, 1950

2,496,167

UNITED STATES PATENT OFFICE 2,496,167

PIPE COUPLING

Charles E. Knox, Jr., Enid, Okla.

Application May 10, 1948, Serial No. 26,151

4 Claims. (Cl. 285—112)

This invention relates to pipe couplings and has relation more particularly to a coupling of this kind particularly designed and adapted for use in connection with concrete pipe and the like.

It is an object of the invention to provide a coupling comprising a male part and a female part, together with means carried by the parts for interlocking engagement and wherein each of the parts is provided with means for effectively securing the same to the pipe.

The invention consists in the details of construction and in the combination of the several parts of my improved pipe couplings whereby certain advantages are attained, as will be hereinafter more fully set forth.

In order that my invention may be better understood I will now proceed to describe the same with reference to the accompanying drawings, wherein:

In the drawings—

Figure 1 is a fragmentary section view illustrating a coupling embodying the invention;

Figure 2 is a front elevational view of the female member;

Figure 3 is a front elevational view of the male member; and

Figure 4 is a fragmentary side elevational view of the coupling with the members separated.

As disclosed in the accompanying drawings, B denotes a pipe body of suitably molded cementitious or other initially plastic material. Associated with the extremities of the body B are the coupling members M and F, the member M constituting a male member and the member F constituting a female member.

The member M, in the present embodiment of the invention, comprises an annular sleeve of required dimension, having closely adjacent to its inner margin, the equidistantly and circumferentially spaced anchor members 2. Each of these members 2 depend from the annular member 1 and is preferably conoidal in form with its smaller end outermost. Each of the members 2 is also of a material length for effective embodiment in the wall of the pipe body B at time of molding.

The member M is applied at the time of the molding operation and the outer or peripheral face of the sleeve 1 is substantially flush with the adjacent inner portion of the peripheral surface of the body B.

The outer margin of the sleeve 1 is defined by an inwardly directed and heavy continuous annular wall or flange 3 against which the molded body B closely engages. The free marginal edge of the flange or wall 3 is substantially flush with the wall face of the bore 4 of the body B.

The free marginal portion of the wall or flange 3 is defined by an outstanding heavy cylindrical cuff 5 of desired length and the bore 6 of which is a continuation of the bore 4 of the body B. The free outer portion of the cuff 5 is provided at substantially diametrically opposed points with the outstanding lugs 7 rigid therewith. Each of these lugs 7 is preferably of a length materially in excess of its width with the longitudinal axis of the lug disposed in a direction axially of the cuff 5.

The female member F comprises a sleeve 8 having the inwardly disposed members 9 similar to the members 2 for holding the sleeve 8 in secure position upon its associated end portion of the body B. The outer marginal portion of the sleeve 8 is defined by the inwardly directed continuous wall or flange 10 against which the adjacent end of the body B closely engages and the central opening 11 defined by the wall or flange 10 constitutes a continuation of the adjacent portion of the bore 4 of the body B.

The outer marginal portion of the wall or flange 10 is provided with the outstanding cuff 12, the wall of which being of such thickness to provide an outwardly opening socket 13 of a diameter substantially equal to but slightly less than the radial diameter taken through the outer portion of the cuff 5 and the opposed lugs 7.

The outer marginal portion of the cuff 12 has rigid therewith the inwardly disposed flange 14 extending therearound and provided at diametrically opposed points with the notches 15 extending thereacross and of a size to permit passage therethrough of the lugs 7 of a member M of a second body B. The space between the inner face of the flange 14 and the opposed face of the wall or flange 10 is slightly in excess, preferably about one eighth (⅛) of an inch, of the space between the inner end of each of the lugs 7 and the opposed face of the flange 3 of the male member.

After the cuff 5 of the male member M has been properly inserted within the cuff 12 of a female member F, the lugs 7 will be entirely within the annular groove or channel 16 provided between the flanges 14 and the wall or flange 10 of the female member. Upon rotation of either of the bodies B being coupled, the lugs 7 will be moved to one side of the notches 15 and behind the flange 14 whereby the meeting ends of the pipe bodies or section B will be effectively held in desired assembled relation.

The outer face *a* of the flange 3 of the male member M is disposed inwardly and outwardly on a predetermined angle and the outer faces *b* of the cuff 12 and flange 14 of the female member F are disposed on a complemental angle for close approach to the face *a* of the flange 3. The face *b* of the cuff 12 is provided with the annular channel 17 to allow for the proper placement of a suitable gasket or other sealing medium to assure a tightly closed connection between the meeting ends of bodies or pipes B.

From the foregoing description it is thought to be obvious that a pipe coupling constructed in accordance with my invention is particularly well adapted for use by reason of the convenience and facility with which it may be assembled and operated.

I claim:

1. In combination with a pipe body molded from initially plastic material, coupling members carried by opposite end portions thereof, one member being male and the other female, each of the members comprising a sleeve snugly surrounding an end portion of the pipe body, inwardly disposed anchoring members carried by the sleeve for embedment in the pipe body, an inwardly extending continuous flange at the outer portion of the sleeve and overlying the end face of the pipe body, a cuff extending axially from the flange, the cuff of the male member being at the inner marginal portion of the flange, the cuff of the female member being at the outer peripheral portion of the flange and of an internal diameter to receive the cuff of a male member, and means carried by each of the cuffs for coaction with an associated cuff to hold the same against separation.

2. In combination with a pipe body molded from initially plastic material, coupling members carried by opposite end portions thereof, one member being male and the other female, each of the members comprising a sleeve snugly surrounding an end portion of the pipe body, inwardly disposed anchoring members carried by the sleeve for embedment in the pipe body, an inwardly disposed continuous flange at the outer portion of the sleeve, a cuff extending outwardly from the flange, the cuff of the male member being at the free marginal portion of the flange, the cuff of the female member being at the outer peripheral portion of the flange and of an internal diameter to receive the cuff of a male member, an outstanding flange carried by and extending around the outer end portion of one of the cuffs and provided with spaced notches, and lugs carried by the outer end portion of the second cuff, said lugs being of a size to pass through the notches in the flange of the first named cuff.

3. The combination with the meeting portions of pipe bodies; a coupling comprising a male member and a female member, means for anchoring each of the members to an end portion of a pipe body including a sleeve snugly surrounding a pipe body, anchoring members extending from the sleeve into the associated portion of the pipe body, and an inwardly disposed flange at the outer extremity of the sleeve; a cuff extending outwardly from the free or inner marginal portion of the flange of the male member, a cuff extending from the outer marginal portion of the flange of the female member to receive the cuff of the male member, outwardly disposed lugs carried by the outer end portion of the cuff of the male member and spaced circumferentially therearound, an outstanding flange carried by the outer end portion of cuff of the female member and provided thereacross with notches positioned to allow the lugs of the male member to pass therethrough upon initial movement of the cuff of the male member into the cuff of the female member, said lugs being entirely inwardly of the flange of the cuff of the female member when the cuff of the male member has reached substantially the limit of its movement into the cuff of the female member, relative rotation of the pipe bodies bringing the lugs of the male member to the rear of the flange of the cuff of the male member to hold the pipe bodies against separation.

4. The combination with the meeting portions of pipe bodies; a coupling comprising a male member and a female member, means for anchoring each of the members to an end portion of a pipe body including a sleeve snugly surrounding a pipe body, anchoring members extending from the sleeve into the associated portion of the pipe body, and an inwardly disposed flange at the outer extremity of the sleeve; a cuff extending outwardly from the free or inner marginal portion of the flange of the male member, a cuff extending from the outer marginal portion of the flange of the female member to receive the cuff of the male member, outwardly disposed lugs carried by the outer end portion of the cuff of the male member and spaced circumferentially therearound, an outstanding flange carried by the outer end portion of the cuff of the female member, and provided thereacross with notches positioned to allow the lugs of the male member to pass therethrough upon initial movement of the cuff of the male member into the cuff of the female member, said lugs being entirely inwardly of the flange of the cuff of the female member when the cuff of the male member has reached substantially the limit of its movement into the cuff of the female member, relative rotation of the pipe bodies bringing the lugs of the male member to the rear of the flange of the cuff of the male member to hold the pipe bodies against separation, the outer end face of one of the cuffs having a channel therearound to receive a sealing medium.

CHARLES E. KNOX, Jr.

REFERENCES CITED

The following references are of record in the file of this patent:

UNITED STATES PATENTS

| Number | Name | Date |
| --- | --- | --- |
| 1,302,553 | Hickson | May 6, 1919 |
| 1,475,150 | Sweney | Nov. 20, 1923 |
| 1,830,973 | Wheaton | Nov. 10, 1931 |